Oct. 25, 1960   T. J. BURKE ET AL   2,957,625
CALCULATING DEVICE
Filed Oct. 15, 1958   2 Sheets-Sheet 1
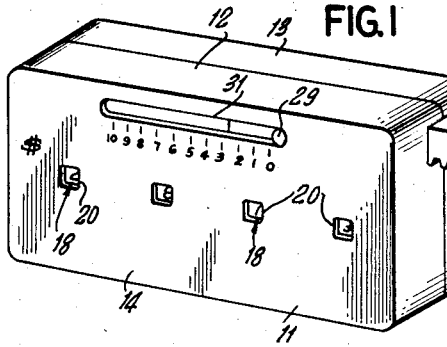
FIG. 1
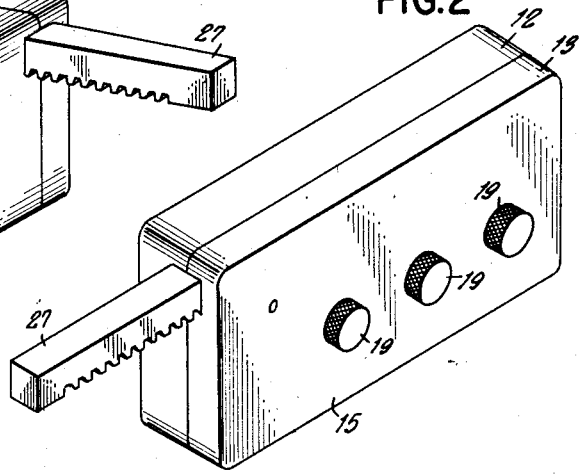
FIG. 2
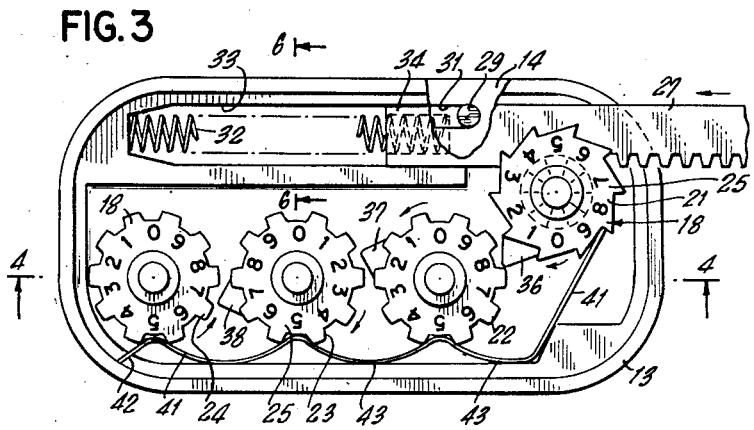
FIG. 3
FIG. 4
THOMAS J. BURKE
C. GEORGE DANDROW, Jr.
CHARLES W. SCHNEIBLE
INVENTOR.
BY Frank M. Murphy
ATTORNEY Oct. 25, 1960 T. J. BURKE ET AL 2,957,625
CALCULATING DEVICE
Filed Oct. 15, 1958 2 Sheets-Sheet 2

THOMAS J. BURKE
C. GEORGE DANDROW, Jr.
CHARLES W. SCHNEIBLE
INVENTOR.

BY
Frank M. Murphy
ATTORNEY

United States Patent Office 2,957,625
Patented Oct. 25, 1960

2,957,625
CALCULATING DEVICE

Thomas J. Burke, White Plains, C. George Dandrow, Jr., Bronxville, and Charles W. Schneible, New Rochelle, N.Y., assignors to Uniquitems Ltd., White Plains, N.Y., a corporation of New York Filed Oct. 15, 1958, Ser. No. 767,302
4 Claims. (Cl. 235—114)

This invention relates to calculating devices and provides such a device which can be mechanical in operation and can be employed to carry out addition calculations.

The invention was occasioned by the need for an adding machine of such size and simplicity that it is suitable for use by shoppers to total the cost of commodity selections. A service for which the device of the invention is particularly well suited, is to maintain a record of the cost of selections made in a supermarket, i.e. a store in which purchasers collect items of merchandise and then present the collected items to a clerk for determination of the total cost of the merchandise. Thus, the price of each selection can be entered on the calculating device as it is made and a current total cost for the selections can be maintained. This enables purchasers to gauge expenditures against resources and, of perhaps far greater practical merit, provides a convenient means for purchasers to determine the correctness of the total arrived at by the clerk for the merchandise selected.

This service which is particularly contemplated for the device of the invention suggests as requirements for the device a size such that it can be carried in a pocket or purse and can be conveniently held in the hand, a simplicity of operation such that its manipulation can be readily mastered by purchasers generally, and durability suitable to the rather rough handling that such a device can be expected to be subjected to.

The manner in which the device of the invention fulfills these and other requirements will be apparent from the following description considered with the accompanying drawing wherein there are depicted embodiments of the invention. In the drawings, Fig. 1 is a perspective view of a device of the invention showing the front side thereof where the total of entries made can be observed;

Fig. 2 is a perspective view showing the rear side of the device shown in Fig. 1;

Fig. 3 is a view of the device shown in Fig. 1 with the cover front section thereof removed;

Fig. 4 is a cross-section taken on line 4—4 of Fig. 3 and showing the cover front section in place on the device;

In the various figures of the drawings, like reference characters refer to corresponding parts.

Figure 5:
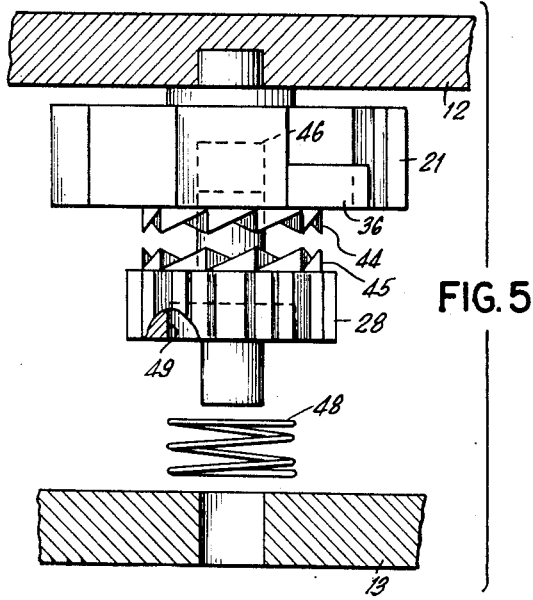
Fig. 5 is an enlarged and exploded view of a portion of the mechanism of the device shown in Fig. 3.

The calculating device shown in the drawing is an adding machine comprising a casing 11 in which there is housed a mechanism responsive to actuation of a spring loaded gear rack 27. The rack 27 is provided with a positioning pin 29 which travels in a slot 31 disposed in the casing 11. A numbered scale is laid out along the slot 31 and the figures to be added are entered in the machine by moving the positioning pin to the corresponding position on the scale. By operation of a movement mechanism contained within the casing, the figures entered in the machine by actuation of the rack 27 register in the openings 20 of the casing and there appears in these openings the total amount of the figures entered.

As can be seen in Fig. 3, the movement mechanism of the device includes, in addition to the rack 27, four cylinders, units cylinder 21, tens cylinder 22, hundreds cylinder 23 and thousands cylinder 24. The cylinders are arranged in a train for response to movement of the rack.

Thus, the tens and hundreds each have gear teeth and the units and tens cylinder each have a pusher tooth for direct actuation, respectively, of the tens and hundreds cylinder by meshing with the cylinder gears. Upon actuation of the rack, units are registered on the units cylinder, tens are registered on the tens wheel, and hundreds are registered on the hundreds wheel. Each of the cylinders has markings in the form of numbers 18 disposed at spaced intervals about a circle lying in the end face of each cylinder confronting the casing front side 14. It is these numbers which are viewed through the openings 20.

According to the invention the gear train consists essentially of a units cylinder 21, tens cylinder 22 and hundreds cylinder 23 and these cylinders are arranged in respect to the rack 27 in the manner that the tens and hundreds cylinders 22 and 23 are disposed on one side of the course of the rack and the units cylinder is disposed across the tens cylinder from the hundreds cylinder and intermediate the tens cylinder and the course of the rack. This arrangement facilitates making the device compact as it eliminates interference of the rack and the cylinders employed in addition to the units cylinder and permits the use of a units cylinder having a small diameter.

Preferably the openings 20 are aligned and the aforementioned arrangement of the cylinders makes it convenient to do this by disposing the opening for each the tens and hundreds cylinders over its cylinder and, with respect to its cylinder, adjacent the rack course and disposing the opening for the units cylinder over the units cylinder and, with respect to its cylinder, remote from the rack course.

As will be readily apparent from Fig. 1, a single reciprocation of the gear rack 27 can be employed to enter on the machine a number between one and ten, and to enter numbers in excess of ten by operation of the gear rack, more than one reciprocation of the rack is necessary. To facilitate entry of numbers in excess of ten, each of the cylinders except the units cylinder is provided with a positioning pin 19. Each positioning pin 19 is coaxially disposed with respect to its cylinder and extends outwardly therefrom so that it projects from the casing 11. By manipulation of the positioning pins 19 entries can be made directly to the cylinders other than the units cylinder 21. Thus for entering numbers in excess of ten, if desired, the entry can be made by a single reciprocation of the gear rack in combination with manipulation of the positioning pins.

In a preferred embodiment of the invention the positioning pins 19 extend outwardly from the end of the cylinders adjacent the rear side of the casing and project outwardly from the rear side of the casing. This arrangement of the positioning pins is preferred because it permits making the positioning pins of suitable diameter without at the same time requiring that the diameter of the cylinder be increased, as would be the case if the positioning pins extended outwardly from the end of the cylinders adjacent the front side of the casing 11, due to interference between the positioning pins and the numbers 18 laid out on the ends of the cylinders adjacent the casing front side 14.

Following entry of figures on the machine and the determination of the total thereby, the device can be reset to zero by manipulation of the rack 27 and the positioning pins 19.

By employing the construction depicted in the drawings, particularly by employing the disclosed arrangement of the cylinders and rack and pinion, and arranging the positioning pins 19 so that they project from the rear side of the casing, the device can be made of such size that it can be conveniently held in the hand. For example, the overall dimensions of the device can be about 3 inches long by about 1½ inches wide by about 1 inch in depth.

Referring now to details of the embodiments shown in the drawings, the casing 11 is formed by front section 12 and rear section 13 and provides a front side 14 and rear side 15. Disposed within the casing 11 are at least three cylinders, the number of cylinders in excess of three depending on the number of figures which it is desired that the device include in the total displayed thereby. Preferably the number of cylinders is four. These cylinders are, respectively, units, tens, hundreds, and thousands cylinders 21, 22, 23 and 24. The cylinders are rotatably mounted in the casing 11 with their end faces 25 confronting the casing front side 14 and their axes disposed in parallel relationship.

Figure 6:
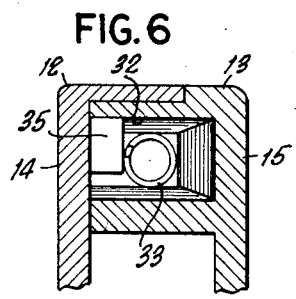
Fig. 6 is a cross-sectional view taken along line 6—6 in Fig. 3, and showing the casing front section in place.

The device further comprises a gear rack and pinion 26 including gear rack 27 and pinion 28. The gear rack 27 is mounted for reciprocation over a linear course extending from without the casing to within the casing and has projecting from the front side thereof the positioning pin 29 which is received in slot 31 disposed in the front side 14 of the casing. A spring 32 is disposed in recess 33 of the casing and is compressed between the end of the casing recess 33 and the inwardly disposed end of the gear rack where it is received in rack recess 34. As can be seen in Fig. 6, to facilitate positioning of the spring 33 in the casing recess 32 the casing front section 12 is formed with a depending block 35 which serves to restrict the spring to the casing recess 32. The spring 32 yieldingly urges the rack 27 to the right side of the casing 11, as viewed in Fig. 3, so that the positioning pin abuts with the right hand end of the slot 31. The pinion 28 is disposed within the casing 11 for cooperation with the rack in a manner shortly to be described.

The movement of the device, broadly considered, is known in the art. The last three of the cylinders, namely cylinders 22, 23, and 24, are developed as spur gears and the units cylinder 21 is developed as a ratchet gear, and the ratchet gear and the tens and hundreds cylinders 22 and 23 are provided, respectively, with pusher teeth 36, 37 and 38 which are disposed on the cylindrical surfaces of their cylinders. The pusher teeth are at axially spaced intervals and are developed so that they interconnect the cylinders in a gear train with the pusher tooth of each cylinder meshing with the teeth of the next succeeding gear only and in the manner that each pusher tooth as it rotates meshes with successive teeth of the gear with which it engages.

In the operation of the device, entries can be made by reciprocating the gear rack 27. Interconnecting means are provided for interconnecting the rack 27 and first cylinder 21 through the pinion 28 for rotating the first cylinder in response to the movement of the rack inwardly with respect to the casing, and disengaging means are provided for disengaging the rack and first cylinder upon movment of the rack outwardly of the cylinder. Thus, each entry can be retained by the device and addition of successive entries can be effected. In the embodiment shown in Figs. 3, 4 and 5, the interconnecting-disconnecting means includes a ratchet and pawl arrangement, which limits rotation of the first cylinder 21 to one direction, and a unidirectional clutch means which is operatively interposed between the pinion 28 and first cylinder 21 for rotating the cylinder 21 in the direction permitted by the ratchet and pawl arrangement and disengaging the pinion and first cylinder upon movement of the pinion in the direction opposite to that corresponding to the movement of the cylinder 21 permitted by the ratchet and pawl arrangement.

The ratchet and pawl arrangement is provided by the development of the first cylinder 21 as a ratchet gear and the positioning spring 41, which serves as a positioning spring for the spur gears of cylinders 22, 23 and 24 and also as the pawl for the ratchet gear of the first cylinder 21. The positioning spring 41 is secured to the casing by snug engagement with slot 42 and recesses 43. The positioning spring can be a wire formed of spring steel.

The unidirectional clutch is provided by arranging the ratchet gear and pinion 28 coaxially and positioning on the confronting faces of these gears mating crown ratchet gears 44 and 45, respectively, the crown ratchet gears being arranged to engage upon movement of the rack and pinion in the direction corresponding to the direction for which motion is to be imparted to the first cylinder 21 and to disengage upon movement of the rack and pinion in the opposite direction. To facilitate operation of the clutch, the ratchet gear is provided with a recess 46 which slidably receives an extension pin 47 of the pinion 28, whereby suitable alignment is maintained, and a spring 48 is interposed between the pinion 28 and the rear side 15 of the casing 11. The spring 48 yieldingly urges the crown ratchets into engagement. A recess 49 is formed in the pinion adjacent the casing rear side 15 for receiving the spring 48.

Figure 7:
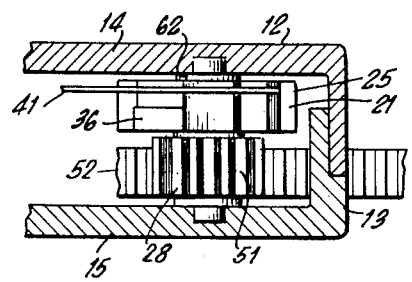
Fig. 7 is a cross-section of a portion of a device according to the invention and showing an alternate construction for the portion of the calculating device mechanism set forth in Fig. 5.
Figure 8:
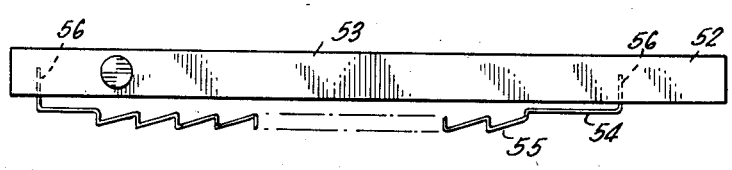
Fig. 8 is a view of a gear rack suitable for use with the embodiment set forth in Fig. 7.

An alternative arrangement for the interconnecting-disconnecting means is depicted in Fig. 7 and Fig. 8. Here also the first cylinder 21 is developed as a ratchet gear and positioning spring 41 provides a ratchet and pawl arrangement limiting rotation of the first cylinder to one direction, and the pinion 28 is disposed coaxially with respect to the first cylinder 21. The pinion, however, is fixedly secured to the first cylinder 21 and the desired clutch action is provided by developing the pinion and rack 50 as a ratchet pinion 51 and ratchet rack 52. As the ratchet rack 52 is moved inwardly with respect to the casing 11, the ratchet rack and pinion are maintained in operative engagement and as the ratchet rack is moved outwardly, disengagement of the ratchet rack and pinion occurs. Conveniently, disengagement is facilitated, as is shown in Fig. 8, by forming the ratchet rack 52 of a bar 53 and spring steel wire 54 formed to provide ratchet teeth 55. The wire 54 can be suitably mounted on the bar 53 by a press fit of ends of the wire into holes 56 formed in the bar.

Figure 9:
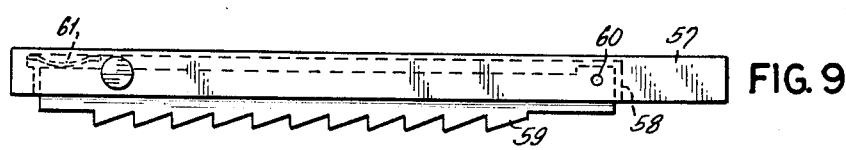
Fig. 9 is a view of another gear rack suitable for use with the embodiment shown in Fig. 7.
Figure 10:
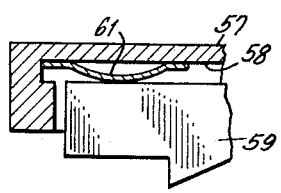
Fig. 10 is a cross-sectional view of a portion of the device shown in Fig. 9.

Alternatively, the ratchet rack can be constructed as shown in Figs. 9 and 10. In this embodiment, a bar 57 is provided with a slot 58 which loosely receives a ratchet blade 59. The blade 59 is pivotally mounted in the slot 58 at 60 and there is positioned in the slot a leaf spring 61 which yieldingly urges the blade outwardly, and thus is adapted to yieldingly urge the blade into engagement with a ratchet pinion.

A feature of the device of the invention is that each of the cylinders is of substantially the same diameter. This facilitates production and also the making of the device of small size. In order to obtain the gear train action of the movement mechanism provided by the gears while at the same time having the cylinders the same diameter, the pusher teeth are made irregular with respect to the gear recesses with which they mesh. Thus as can be seen in Fig. 3, the pusher teeth 36, 37 and 38 are of triangular shape whereas the recesses with which they mesh are trapezoidal in form.

To improve the operation of the movement mechanism, the cylinders are rotatably mounted in the casing 11 in a special manner. The purpose of this special mounting is to minify differences in gear rack actuation force requirements incidental to engagement or engagements between the pusher teeth and the cylinder gearing with which the pusher teeth mesh. If the first cylinder 21 is rotated by actuation of the rack without engagement of its pusher tooth 36 with the gearing of second cylinder 22, the actuation force will be less than if the pusher tooth 36 does mesh with the gearing of the second cylinder, and this phenomenon occurs between each pair of meshing cylinders. According to the invention, the differences in force requirements are minified by journaling the cylinders in the casing 11 and interposing between the cylinders and the front side 14 of the casing, and between the cylinders and the rear side 15 of the casing, respectively, the shoulders 62 and 63, which are of substantially less diameter than the cylinders. This construction is effective to reduce force requirement differences as it reduces the friction resisting movement of the gear train. In the embodiments shown in Figs. 3, 4 and 5, a shoulder is not interposed between the first cylinder 21 and the rear side 15 of the casing as the pinion of the rack and pinion is arranged in this location.

Various materials can be employed for construction of the parts of the device. Advantageously, the parts except for the springs can be plastic, e.g. the casing can be polystyrene and the moving parts can be cast nylon.

Having now described the invention, what is claimed is:

1. A hand size adding machine comprising a casing having a front side and a rear side, a units cylinder for registering units, a tens cylinder for registering tens and a hundreds cylinder for registering hundreds rotatably mounted in the casing with an end face of each cylinder confronting the casing front side and the cylinder axes disposed in parallel relationship, a rack and pinion operatively connected to the units cylinder for actuation thereof by operation of the rack, said tens and hundreds cylinder each having gear teeth and said units and tens cylinder each having a pusher tooth for direct actuation, respectively, of said tens and hundreds cylinder by meshing with the cylinder gears, whereby upon actuation of the rack units are registered on the units cylinder, tens are registered on the tens cylinder and hundreds are registered on the hundreds cylinder, said tens and hundreds cylinders being disposed on one side of the course of the rack and said units cylinder being disposed across the tens cylinder from the hundreds cylinder and intermediate the tens cylinder and the course of the rack, whereby interference between the rack and tens and hundreds cylinder is conveniently avoided and the cylinders and rack and pinion can be arranged in a small space, each cylinder having markings disposed at spaced intervals about a circle lying in the end face thereof confronting the casing front side, means defining an opening in the casing front side for each cylinder for viewing individually the markings of its cylinder, the openings in the casing for viewing markings on the cylinders being aligned, the opening for each the tens and hundreds cylinders being over its cylinder and with respect to its cylinder being adjacent the rack course and the opening of the units cylinder being over the units cylinder and, with respect to the units cylinder remote from the rack course, said tens and hundreds cylinder each having a pin fixedly secured thereto and coaxial therewith and extending through the rear side of the casing and projecting therefrom, whereby each the tens and hundreds cylinders can be rotated by operation of its pin and entries to the tens and hundreds cylinder can be made by manual operation of the pins.

2. A handsize adding machine according to claim 1, and including a thousands cylinder for registering thousands and arranged in the adding machine and operatively connected with the hundreds cylinder as the hundreds cylinder is arranged in the adding machine and operatively connected with the tens cylinder.

3. A hand size adding machine comprising a units cylinder for registering units, a tens cylinder for registering tens and a hundreds cylinder for registering hundreds, a rack and pinion operatively connected to the units cylinder for actuation thereof by operation of the rack, said tens and hundreds cylinder each having gear teeth and said units and tens cylinder each having a pusher tooth for direct actuation, respectively, of said tens and hundreds cylinder by meshing with the cylinder gears, whereby upon actuation of the rack units are registered on the units cylinder, tens are registered on the tens cylinder and hundreds are registered on the hundreds cylinder, said tens and hundreds cylinders being disposed on one side of the course of rack and said units cylinder being disposed across the tens cylinder from the hundreds cylinder and intermediate the tens cylinder and the course of the rack, whereby interference between the rack and tens and hundreds cylinder is conveniently avoided and the cylinders and rack and pinion can be arranged in a small space, said adding machine including a casing having a front side and a rear side, said cylinders being rotatably mounted in the casing with an end face of each cylinder confronting the casing front side and the cylinder axes disposed in parallel relationship, each cylinder having markings disposed at spaced intervals about a circle lying in the end face thereof confronting the casing front side, means defining an opening in the casing front side for each cylinder for viewing individually the markings of its cylinder, said openings being aligned, the opening for each the tens and hundreds cylinders being over its cylinder and with respect to its cylinder being adjacent the rack course and the opening of the units cylinder being over the unit cylinder with respect to the units cylinder, remote from the rack course.

4. A handsize adding machine according to claim 3, and including a thousands cylinder for registering thousands and arranged in the adding machine and operatively connected with the hundreds cylinder as the hundreds cylinder is arranged in the adding machine and operatively connected with the tens cylinder.

References Cited in the file of this patent

UNITED STATES PATENTS

| | | |
|---|---|---|
| 809,446 | Johnson | Jan. 9, 1906 |
| 865,200 | Moore | Sept. 3, 1907 |
| 1,521,631 | Kaiser | Jan. 6, 1925 |
| 1,651,033 | McClellan et al. | Nov. 29, 1927 |
| 1,750,456 | Borm | Mar. 11, 1930 |
| 2,548,837 | Wright | Apr. 10, 1951 |

UNITED STATES PATENT OFFICE
CERTIFICATE OF CORRECTION

Patent No. 2,957,625

October 25, 1960

Thomas J. Burke et al.

It is hereby certified that error appears in the printed specification of the above numbered patent requiring correction and that the said Letters Patent should read as corrected below.

Column 6, line 47, before "with" insert -- and --.

Signed and sealed this 25th day of April 1961.

(SEAL)
Attest:
ERNEST W. SWIDER
Attesting Officer

DAVID L. LADD
Commissioner of Patents